United States Patent
Avery

(10) Patent No.: US 6,691,185 B2
(45) Date of Patent: Feb. 10, 2004

(54) APPARATUS FOR MERGING A PLURALITY OF DATA STREAMS INTO A SINGLE DATA STREAM

(75) Inventor: James M. Avery, Westford, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 386 days.

(21) Appl. No.: 09/905,281

(22) Filed: Jul. 13, 2001

(65) Prior Publication Data

US 2003/0014572 A1 Jan. 16, 2003

(51) Int. Cl.$^7$ .............................................. G06F 13/00
(52) U.S. Cl. .............................. 710/52; 710/62; 710/72; 370/389; 370/423; 370/412
(58) Field of Search ................................. 370/351–396, 370/412, 422–423; 709/234, 238; 710/11, 29–35, 52–57, 62, 67

(56) References Cited

U.S. PATENT DOCUMENTS

| | | | | |
|---|---|---|---|---|
| 4,677,616 A | * | 6/1987 | Franklin | 370/423 |
| 4,860,357 A | | 8/1989 | Avery | 381/41 |
| 4,926,418 A | | 5/1990 | Cidon | 370/85.5 |
| 5,245,609 A | | 9/1993 | Ofek | 370/94.3 |
| 5,687,325 A | * | 11/1997 | Chang | 710/104 |
| 5,889,776 A | * | 3/1999 | Liang | 370/389 |
| 6,058,436 A | | 5/2000 | Kosco | 710/11 |
| 6,118,788 A | | 9/2000 | Kermani | 370/461 |
| 6,247,058 B1 | * | 6/2001 | Miller et al. | 709/234 |
| 6,363,077 B1 | * | 3/2002 | Wong et al. | 370/422 |
| 6,483,841 B1 | * | 11/2002 | Chang et al. | 370/412 |
| 6,571,321 B2 | * | 5/2003 | Rowlands et al. | 711/141 |
| 6,574,708 B2 | * | 6/2003 | Hayter et al. | 711/118 |
| 2003/0012187 A1 | * | 1/2003 | Avery | 370/389 |

OTHER PUBLICATIONS

U.S. patent application Ser. No. 09/905,483, Avery, Method for Merging a Plurality of Data Steams into a Single Data Stream, Jul. 13, 2001.
API NetWorks, Inc., The Lightning Data Transport I/O Bus Architecture, Revision 1001, 2000.
API NetWorks, Inc., HyperTransport: Universal Interconnect Solution for I/O, Mar. 7, 2001.
API NetWorks, Inc., Lightning Data Transport: Universal Interconnect Solution for I/O, Dec. 13, 2000.
API NetWorks, Inc., HyperTransport Applications in Embedded DSP/RISC Based Systems: A High–Bandwidth, Low–Complexity Embedded I/O Interconnect Architecture.
PCI–to–PCI Bridge Architecture Specification, Revision, 1.1, Dec. 18, 1998.

(List continued on next page.)

Primary Examiner—Christopher B. Shin
(74) Attorney, Agent, or Firm—Park, Vaughan & Fleming LLP

(57) ABSTRACT

An I/O device that includes: an input port; an input buffer coupled to the input port; an internal port operable to store packets generated by the I/O device; an internal buffer coupled to the internal port; a plurality of packet ID arrival registers coupled to the input port and the internal port; autocorrelation logic coupled to the plurality of packet ID arrival registers; an arbiter coupled to the autocorrelation logic; a packet selector coupled to the arbiter, the input buffer and the internal buffer; and an output port coupled to the packet selector.

36 Claims, 10 Drawing Sheets

OTHER PUBLICATIONS

PCI Local Bus Specification, Revision 2.2, Dec. 18, 1998.
Robert M. Metcalfe, Ethernet: Distributed Packet Switching for Local Computer Networks, Jul. 1976.
J. W. Son, An input polling arbitration mechanism for a gigabit packet switch, Cisco Systems, Dynamic Packet Transport Technology and Performance, 2000.
Farooq M. Anjum, Balanced–RED: An Algorithm to achieve Fairness in the Internet, Mar. 8, 1999.
William H. Press, Numerical Recipes in C, 1992, Chapters 12 and 13.
Alain Mayer, Local and Congestion–Driven Fairness Algorithm in Arbitrary Topology Networks, Jun. 2000.
Cisco, Dynamic Packet Transport Technology and Performance.
Rajendra K. Jain, A Quantitative Measure of Fairness and Discrimination for Resource Allocation in Shared Computer System, Sep. 26, 1984.
Sangyup Shim, Supporting Continuous Media: Is Serial Storage Architecture (SSA) Better Than SCSI?, 1997.
Mark W. Garrett, Analysis, Modeling and Generation of Self–Similar VBR Video Traffic, 1994.
Will E. Leland, On the Self–Similar Nature of Ethernet Traffic, 1994.
Jonathan H. B. Deane, The dynamics of deterministic data networks, Jun. 12, 1996.
Terence D. Todd, The Token Grid Network, Jun. 1994.
Jan Beran, Fitting Long–Memory Modules by Generalized Linear Regression, Dec. 1993.
Jan Beran, Statistical Methods for Data with Long–Range Dependence, Nov. 1992.
Jan Beran, On robust local polynomial estimation with long–memory errors.
Mark W. Garrett, Contributions toward real–time services on packet switched networks, 1993.
Jonathan H. B. Deane, Chaotic traffic flow in local area networks.
Edward Ott, Chaos in Dynamical Systems, 1993.

* cited by examiner

| Rxx mag (5) | Rxx mag (4) | Rxx mag (3) | Rxx mag (2) | Rxx mag (1) | Rxx mag (0) | Rxx mag ID 0 max |
|---|---|---|---|---|---|---|
| Rxx mag (5) | Rxx mag (4) | Rxx mag (3) | Rxx mag (2) | Rxx mag (1) | Rxx mag (0) | Rxx mag ID1 max |
| Rxx mag (5) | Rxx mag (4) | Rxx mag (3) | Rxx mag (2) | Rxx mag (1) | Rxx mag (0) | Rxx mag ID m max |
| Rxx mag (5) | Rxx mag (4) | Rxx mag (3) | Rxx mag (2) | Rxx mag (1) | Rxx mag (0) | Rxx mag ID p max |
| Rxx mag (5) | Rxx mag (4) | Rxx mag (3) | Rxx mag (2) | Rxx mag (1) | Rxx mag (0) | Rxx mag ID q max |

ID 0, ID 1, ID m, ID p, ID q x(5), x(4), x(3), x(2), x(1), x(0), max 700, 710

*Figure 7*

APPARATUS FOR MERGING A PLURALITY OF DATA STREAMS INTO A SINGLE DATA STREAM

This patent application discloses subject matter that is related to the subject matter disclosed in U.S. patent application Ser. No. 09/905,483, entitled "Method for Merging a Plurality of Data Streams into a Single Data Stream" filed on even date herein. The above Patent Application is hereby incorporated by reference.

FIELD OF THE INVENTION

The present invention generally relates to I/O devices. More specifically, the present invention relates to a novel apparatus that merges a plurality of data streams into a single data stream.

BACKGROUND

In an effort to increase I/O bandwidth in high performance processor based systems, a number of companies have developed the HyperTransport ("HT") I/O interconnect structure. Briefly, the HT I/O bus structure is a scalable device level architecture that provides a significant increase in transaction throughput over existing I/O bus architectures such as Peripheral Component Interconnect ("PCI") and Advanced Graphics Port ("AGP").

The foundation of the HT I/O bus is dual point-to-point unidirectional links consisting of a data path, control signals, and clock signals. The HT I/O bus can provide both point-to-point links and a scalable network topology using HT I/O switching fabrics. Thus, an HT based system can be expanded using HT switches to support multilevel, highly complex systems.

Communications between multiple HT I/O devices are known as data streams. Each data stream contains one or more packets of information. Each packet of information contains a packet ID and a data payload. The packet ID is also commonly referred to as a unit ID. Because all packets are transferred to or from a host bridge, the packet ID provides information that can be utilized to determine the source or destination of the packet. A more detailed description of the HT I/O bus structure is presented in Appendix A.

FIG. 1 presents an HT I/O device 100 that interfaces with a first unidirectional link 110 and a second unidirectional link 120. Thus, the HT I/O device 100 can receive input data streams and transmit output data streams via unidirectional links 110 and 120. The HT I/O device 100 contains input ports 130 and 150 for receiving data streams and output ports 140 and 160 for transmitting data streams. The HT device 100 may also contain circuitry for generating packets that can be transmitted as output data streams via the output ports 140 and 160.

HT I/O devices may also be daisy chained as shown in FIG. 2. FIG. 2 presents a portion of a single unidirectional link in an HT I/O bus. The unidirectional link shown contains three HT I/O devices 210, 220, and 230. If the first HT I/O device 210 receives a data stream with a destination ID that is equal to the ID of the first HT I/O device 210, then the first HT I/O device 210 will receive and internally process the data stream. However, if the destination ID is not equal to the ID of the first HT I/O device 210, then the first HT I/O device 210 will forward the data stream to the second HT I/O device 220.

As the first HT I/O device 210 may also have the capability to generate packets, the output data stream of the first HT I/O device 210 is a composite of the input packet stream received by the first HT I/O device 210 and the internally generated packets. These internally generated packets will be referred to as an internal data stream.

The data stream received by the first HT I/O device 210 and the device's internal data stream may vary with time. For example, the input data stream for the first HT I/O device 210 may contain no packets over a given time interval. Thus, all packets in the internal data stream generated during that time interval by the first HT I/O device 210 may be transmitted through the first HT I/O device's output port. Alternately, if the data stream received by the first HT I/O device 210 and the device's internal data stream both contain a large number of packets, the HT I/O device may be required to choose between forwarding the received data stream or outputting the internally generated packets. The process by which such a choice is made is known in the art as a forwarding fairness algorithm.

Prior art systems allow an HT I/O device to insert internally generated packets into an output data stream freely if the output data stream is empty. However, if the output data stream contains a large number of packets, the prior art systems only allow the HT I/O device to insert internally generated packets into the output data stream at a rate that is not greater than the rate that the HT I/O device is receiving and forwarding packets from another HT I/O device. Such prior art systems are not optimal. Thus, a more optimal apparatus for merging two data streams into a single data stream is needed.

SUMMARY OF INVENTION

One embodiment of the invention is an I/O device that includes: an input port; an input buffer coupled to the input port; an internal port operable to store packets generated by the I/O device; an internal buffer coupled to the internal port; a plurality of packet ID arrival registers coupled to the input port and the internal port; autocorrelation logic coupled to the plurality of packet ID arrival registers; an arbiter coupled to the autocorrelation logic; a packet selector coupled to the arbiter, the input buffer and the internal buffer; and an output port coupled to the packet selector.

In another embodiment of the invention, the arbiter includes an autocorrelation magnitude table.

In another embodiment of the invention, the arbiter includes a maximum autocorrelation magnitude table.

In another embodiment of the invention, the arbiter is operable to command the packet selector to select a packet from one of the plurality of input buffers based upon the output of the autocorrelation logic.

Another embodiment of the invention is an I/O device that includes: a first input port; a first input buffer coupled to the first input port; a second input port; a second input buffer coupled to the second input port; a plurality of packet ID arrival registers coupled to the first input port and the second input port; autocorrelation logic coupled to the plurality of packet ID arrival registers; an arbiter coupled to the autocorrelation logic; a packet selector coupled to the arbiter, the first input buffer and the second input buffer; and an output port coupled to the packet selector.

Another embodiment of the invention is an I/O device that includes: a first internal port operable to store packets generated by the I/O device; a first internal buffer coupled to the first internal port; a second internal port operable to store packets generated by the I/O device; a second internal buffer coupled to the second internal port; a plurality of packet ID arrival registers coupled to the first internal port and the second internal port; autocorrelation logic coupled to the plurality of packet ID arrival registers; an arbiter coupled to the autocorrelation logic; a packet selector coupled to the arbiter, the first internal buffer and the second internal buffer; and an output port coupled to the packet selector.

Another embodiment of the invention is an HT I/O device that includes: an input port; an input buffer coupled to the input port; an internal port for storing packets generated by the HT I/O device; an internal buffer coupled to the internal port; and a plurality of packet ID arrival registers coupled to the input port and the internal port.

BRIEF DESCRIPTION OF THE FIGURES

FIG. 7 presents one embodiment of an autocorrelation magnitude table and one embodiment of a maximum autocorrelation magnitude table.

DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
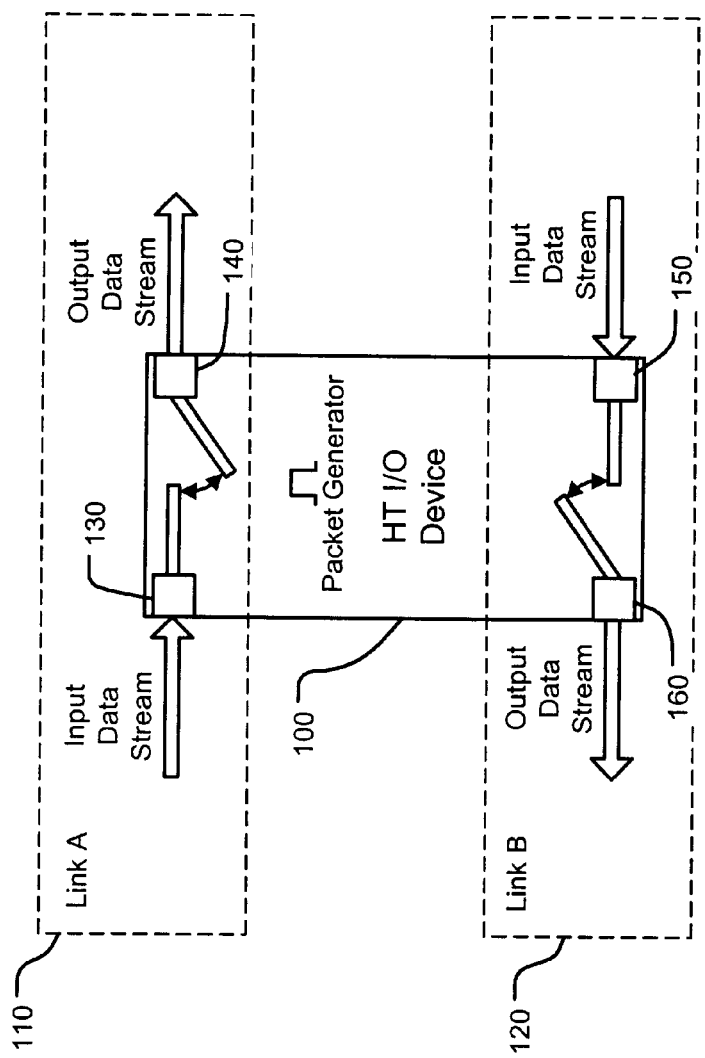
FIG. 1 presents an HT I/O device that interfaces with two unidirectional links.
Figure 2:
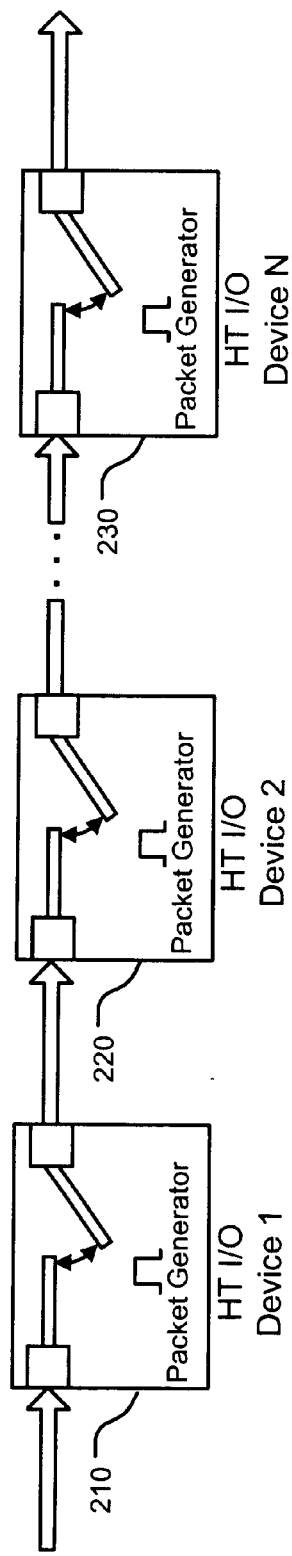
FIG. 2 presents a portion of a single unidirectional link in an HT I/O bus.
Figure 3:
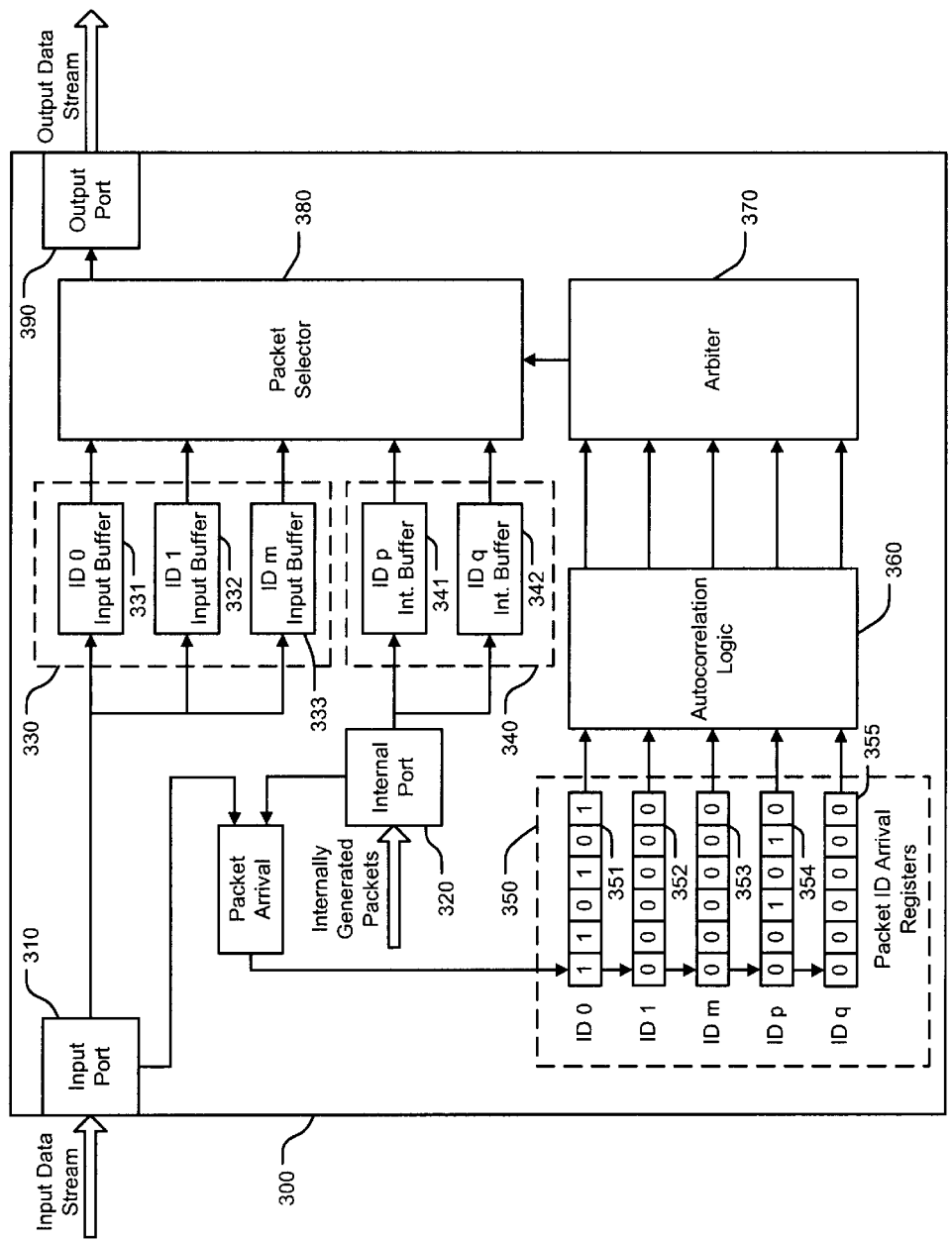
FIG. 3 presents a portion of an HT I/O device.

FIG. 3 presents a portion of an HT I/O device 300. The HT I/O device 300 is coupled to a unidirectional link in an HT I/O bus structure. The HT I/O device 300 would also typically be coupled to another unidirectional link. However, this second unidirectional link is not shown in order not to obscure the invention.

Input Port

Figure 4:
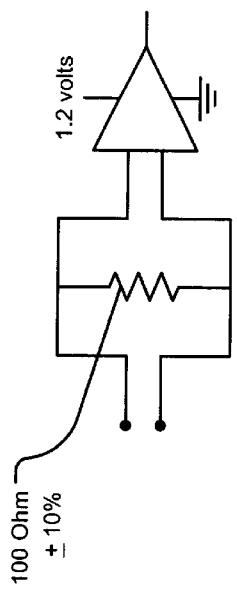
FIG. 4 presents one embodiment of an input port.

The HT I/O device 300 can receive a data stream via the device's input port 310. The input port 310 may be any type of port that is operable to receive a data stream. In one embodiment, the input port 310 includes a plurality of input receivers configured as shown in FIG. 4. Each of the plurality of input receivers can receive a single differential signal. Examples of such differential signals could include command, address, data, clock, and control signals. By including sufficient input receivers configured as shown in FIG. 4, the HT I/O device 300 can receive a data stream from an HT I/O bus.

Internal Port

In addition to the input port 310, the HT I/O device may include an internal port 320. The internal port 320 may be any type of port that is operable to receive and optionally temporarily store, one or more packets in a data stream that were generated by the HT I/O device 300. For example, the internal port 320 may be a buffer such as a circular buffer, a first-in-first-out buffer, or a queue buffer. Alternatively, the internal port 320 may be one or more registers.

Input Buffers

As shown in FIG. 3, the input port 310 is coupled to a plurality of input buffers 330. Input buffers 331, 332, and 333 may be any type of buffer, such as but not limited to circular buffers, first-in-first-out buffers, or queue buffers. Alternatively, such buffers may be a plurality of registers. Each of the input buffers 331, 332, and 333 is associated with a unique ID. As shown in FIG. 3, the first input buffer 331 is associated with ID 0, the second input buffer 332 is associated with ID 1, and the third input buffer 333 is associated with ID m. These input buffers 331, 332, and 333 store packets having a packet ID that is equal to the ID associated with the input buffer.

For example, ID 0 may be set to 10 h. Thus, if two packets are received by input port 310 and the packet ID for both of the packets is equal to 10 h, then the packets would be stored in the first input buffer 331. Because the ID of each input buffer is unique, the packets would only be stored in a single input buffer.

Internal Buffers

In embodiments of the invention that include an internal port 320, the internal port 320 may be coupled to a single internal buffer (not shown) or a plurality of internal buffers 340. Internal buffers 341 and 342 may be any type of buffer or register. Each of the internal buffers 341 and 342 is associated with a unique ID. As shown in FIG. 3, the first internal buffer 341 is associated with ID p and the second input buffer 342 is associated with ID q. These internal buffers 341 and 342 store packets generated internally by the HT I/O device having a packet ID that is equal to the ID associated with the internal buffer.

Figure 10:
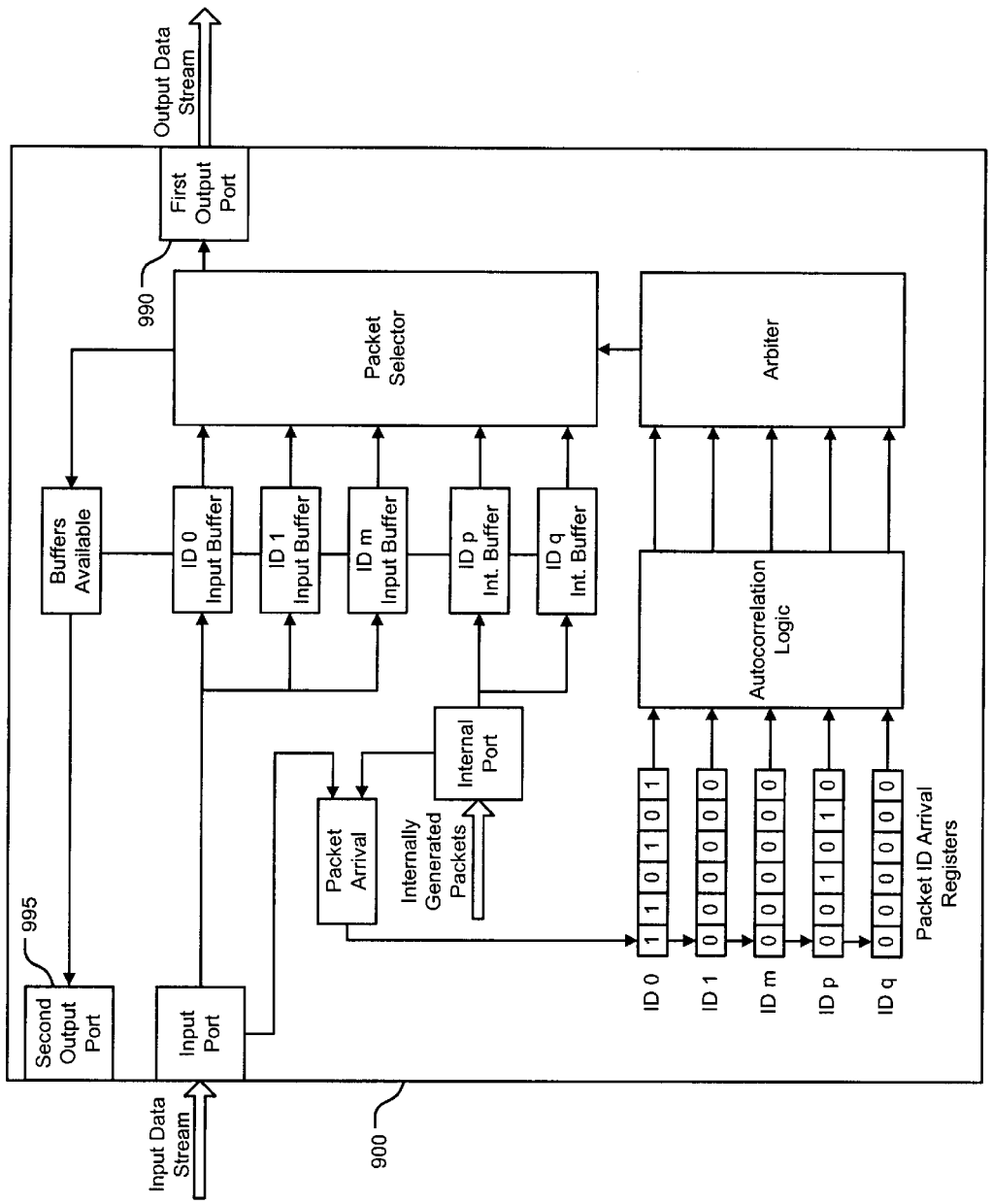
FIG. 10 presents a portion of an HT I/O device that sends flow control information to packet transmitters.
Figure 11:
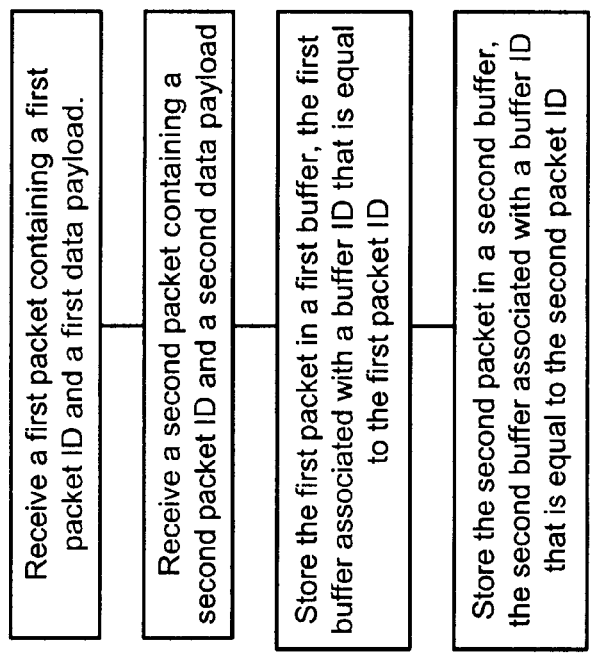
FIG. 11 presents a flow chart of a method to store data in a plurality of registers.

A summary of the previously discussed method of storing packets in input buffers 330 and/or in internal buffers 340 is summarized in FIG. 10.

Packet ID Arrival Registers

As shown in FIG. 3, the input port 310 is also coupled to a plurality of packet ID arrival registers 350. Each of these registers is associated with a unique ID. As shown in FIG. 3, the first packet ID arrival register 351 is associated with ID 0, the second packet ID arrival register 352 is associated with ID 1, and the third packet ID arrival register 353 is associated with ID m. These packet ID arrival registers 351, 352, and 353 store data that indicates whether a packet received by the input port 310 contains a packet ID that is equal to the ID associated with the packet ID arrival register.

For example, as discussed above, ID 0 may be set to 10 h. Thus, if a packet is received by input port 310 and the packet ID is equal to 10 h, then data, such as a "1", would be stored in the first packet ID arrival register 351. Because the ID of each packet ID arrival register is unique, data, such as a "0", would be stored in each of the other packet ID arrival registers.

A packet ID arrival register may be any type of register. However, in some embodiments of the invention, the packet ID arrival registers would be shift registers so that older data could be efficiently shifted out as new data is stored in the packet ID arrival registers.

In embodiments of the invention that include an internal port 320, the internal port 320 is also coupled to the plurality of packet ID arrival registers 350. In these embodiments, a packet ID arrival register's ID, such as the fourth packet ID arrival register's ID, ID p, shown in FIG. 3, may be set to 15 h. Thus, if the HT I/O device 300 internally generates a packet with a packet ID equal to 15 h, and the packet is sent to the internal port, then data, such as a "1", would be stored in the fourth packet ID arrival register 354. Because the ID of each packet ID arrival register is unique, data, such as a "0", would be stored in each of the other packet ID arrival registers 351, 352, 353 and 355.

Autocorrelation Logic

The packet ID arrival registers are coupled to autocorrelation logic 360. In one embodiment, for each packet ID arrival register, the autocorrelation logic 360 uses the data stored in the packet ID arrival register to calculate the autocorrelation vector, Rxx(T), of the data stored in the packet ID arrival register over the interval T. The autocorrelation vector of such data can be calculated using the following equation:

$$Rxx(T) = \frac{1}{N-T} \sum_{n=0}^{N-1} x(n)x(n+T) \quad T = (0, 1, 2, \ldots, N-1)$$

In the above equation, T and N are integers, and x( ) is an array that includes data stored in one of the plurality of packet ID arrival registers 350. Conceptually, the summed portion of the above equation corresponds to taking data in a packet ID arrival register, shifting it by T elements, multiplying the result element by element with the unshifted packet ID arrival register, and then summing the products. Thus, the magnitude of the autocorrelation vector, Rxx(T), represents the approximate arrival rate of incoming packets. Similarly, peaks in the autocorrelation vector, Rxx(T), approximate the average arrival frequency of incoming packets.

Figure 6:
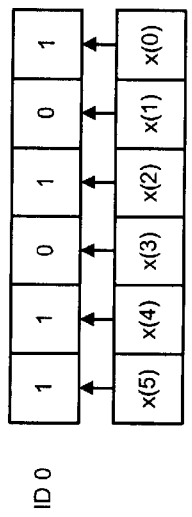
FIG. 6 presents one method of utilizing data contained in a packet ID arrival register in an autocorrelation function.

FIG. 6 indicates how the data contained in the first packet ID arrival register 351 can be utilized in the above equation. The right most element in the first packet ID arrival register 351 is addressed as x(0). Similarly, the leftmost element in the first packet ID arrival register 351 is addressed as x(5). As discussed above, a "1" in the array indicates the arrival of a packet that contains a packet ID that is equal to the ID associated with a specific packet ID arrival register. Similarly, a "0" in the array indicates the arrival of a packet that contains a packet ID that is not equal to the ID of a specific packet ID arrival register. By selecting such values for the array, i.e., "1" and "0", the multiplication product x(n)x(n+T) may be replaced with x(n) & x(n+T). Such a replacement will reduce the complexity and die size of the autocorrelation logic 360.

In other embodiments of the invention, the above autocorrelation vector, Rxx(T), is scaled. For example, the biased estimate of the autocorrelation vector:

$$Rxx_{biased}(T) = \frac{Rxx(T)}{N-1}$$

may be calculated by the autocorrelation logic 360. Alternatively, the unbiased estimate of the autocorrelation vector:

$$Rxx_{unbiased}(T) = \frac{Rxx(T)}{N-1-|T|}$$

may be calculated by the autocorrelation logic 360.

Arbiter

The packet arrival determination logic 360 is coupled to an arbiter 370 as shown in FIG. 3. The arbiter 370 receives the autocorrelation vectors from the packet arrival determination logic 360 and determines which packet should be output by the output port 329.

In one embodiment, the arbiter 370 contains an autocorrelation magnitude table 700. As shown in FIG. 7, each row of the autocorrelation magnitude table 700 is associated with a packet ID arrival register. In addition, each column in the autocorrelation magnitude table 700 is associated with a packet whose arrival data is stored in a packet ID arrival register. The autocorrelation magnitude table 700 may be a buffer such as a circular buffer, a first-in-first-out buffer, or a queue buffer. Alternatively, the autocorrelation magnitude table 700 may be composed of registers such as shift registers.

In addition to the autocorrelation magnitude table 700, the arbiter may also contain a maximum autocorrelation magnitude table 710. Each element of the maximum autocorrelation magnitude table 710 is associated with a row of the autocorrelation magnitude table 700, and hence, a packet ID arrival register and a packet ID. The maximum autocorrelation magnitude table 710 may be composed of any of the above buffers or registers.

After the arbiter 370 receives the autocorrelation vector, Rxx(T), for each of the plurality of packet ID arrival registers 350, the arbiter 370 calculates the magnitude of each of the autocorrelation vectors and stores the magnitudes in the autocorrelation magnitude table 700.

Next, for each row in the maximum autocorrelation magnitude table 710, the arbiter 370 calculates the maximum of the autocorrelation magnitudes in each row of the autocorrelation magnitude table 700 and places such maximum values in the maximum autocorrelation magnitude table 710. For example, if the maximum autocorrelation magnitude of the 6 elements in the autocorrelation magnitude table row associated with ID 0, as shown in FIG. 7, is 10 h then the value of 10 h would be stored in the first row of the maximum autocorrelation magnitude table 710.

Next, the arbiter 370 determines which element in the maximum autocorrelation magnitude table 710 contains the largest autocorrelation magnitude. The arbiter 370 then issues a command to the packet selector 380, which is discussed in Section 5.8, to select a packet with the packet ID that is associated with such element.

In still other embodiments of the invention, the arbiter 370 receives $Rxx_{biased}(T)$ or $Rxx_{unbiased}(T)$ vectors instead of the Rxx(T) vectors discussed above. In these embodiments, the arbitration methods would be substantially identical to the methods discussed above.

Packet Selector

The input buffers 330, the internal buffers 340, and the arbiter 370 are each coupled to a packet selector 380. The packet selector 380 can receive packets from any of the plurality of input buffers 330 or from any of the plurality of internal buffers 340. However, the packet selector 380 will receive a packet from these buffers 330 and 340 when it is commanded to do so by the arbiter 370. Thus, when the packet selector 380 receives a command from the arbiter 370 to select a packet from one of these buffers 330 and 340, the packet selector 380 receives a packet and passes the packet to the output port 390.

Output Port

Figure 5:
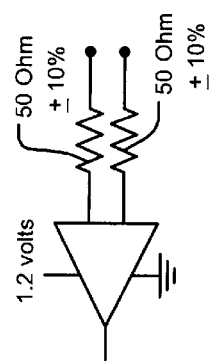
FIG. 5 presents one embodiment of an output port.

As shown in FIG. 3, the packet selector 380 is coupled to an output port 390. The output port may be any type of port that is operable to generate a data stream. In one embodiment, the output port includes a plurality of output drivers configured as shown in FIG. 5. Each of the plurality of output drivers can generate a single differential signal, such as but not limited to, command, address, data, clock, and control signals.

Source IDs, Destination IDs, and Packet IDs

In the above description, packet IDs, which provide information relating to the source or destination of packets, were associated with specific input buffers, internal buffers, and packet ID arrival registers. However, in other embodiments of the invention, the input buffers, internal buffers, and packet ID arrival registers could be associated with any packet information that can be utilized to identify a packet.

Data Streams

As discussed above, FIG. 3 presents only a portion of an HT I/O device 300. The HT I/O device 300 is shown coupled to a single unidirectional link in an HT I/O bus structure. The HT I/O device 300 would also typically be coupled to another unidirectional link. However, this second unidirectional link is not shown in order not to obscure the invention. In many of the embodiments of the invention, the HT I/O device 300 would also include input buffers, internal buffers, packet ID arrival registers, autocorrelation logic, an arbiter, and a packet selector. These components would operate as discussed above to merge an input data stream from the second unidirectional link with the HT I/O device's internal data stream into a single output data stream on the second unidirectional link.

Figure 8:
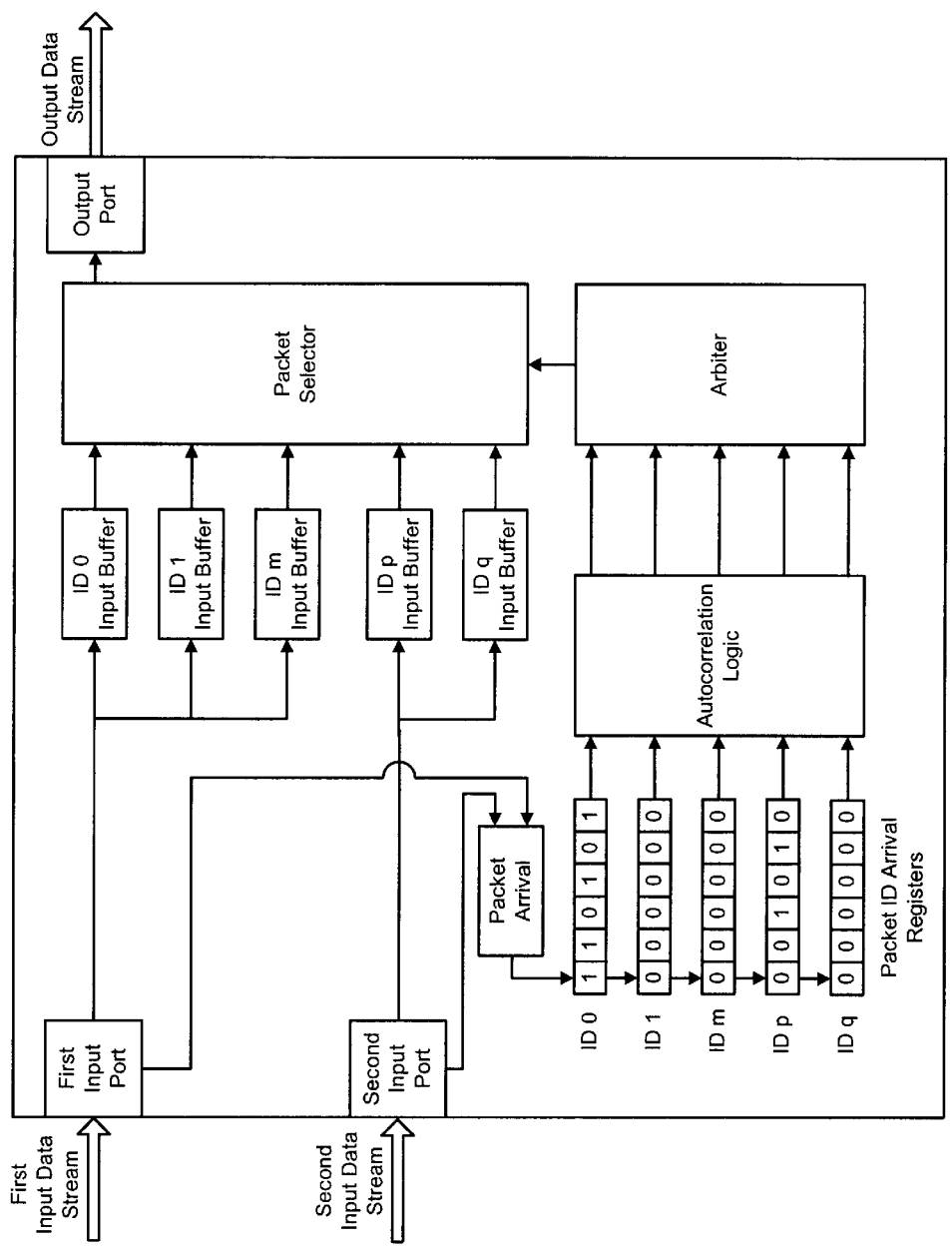
FIG. 8 presents a portion of an HT I/O switch.

While some of the embodiments discussed above merge an input data stream and an internal data stream into a single output data stream, the invention is not so limited. Some embodiments of the invention merge a data stream from one input port with other data stream(s) from one or more input ports. For example, FIG. 8 presents an HT I/O switch capable of merging data streams received from a plurality of input ports into a single output data stream.

Figure 9:
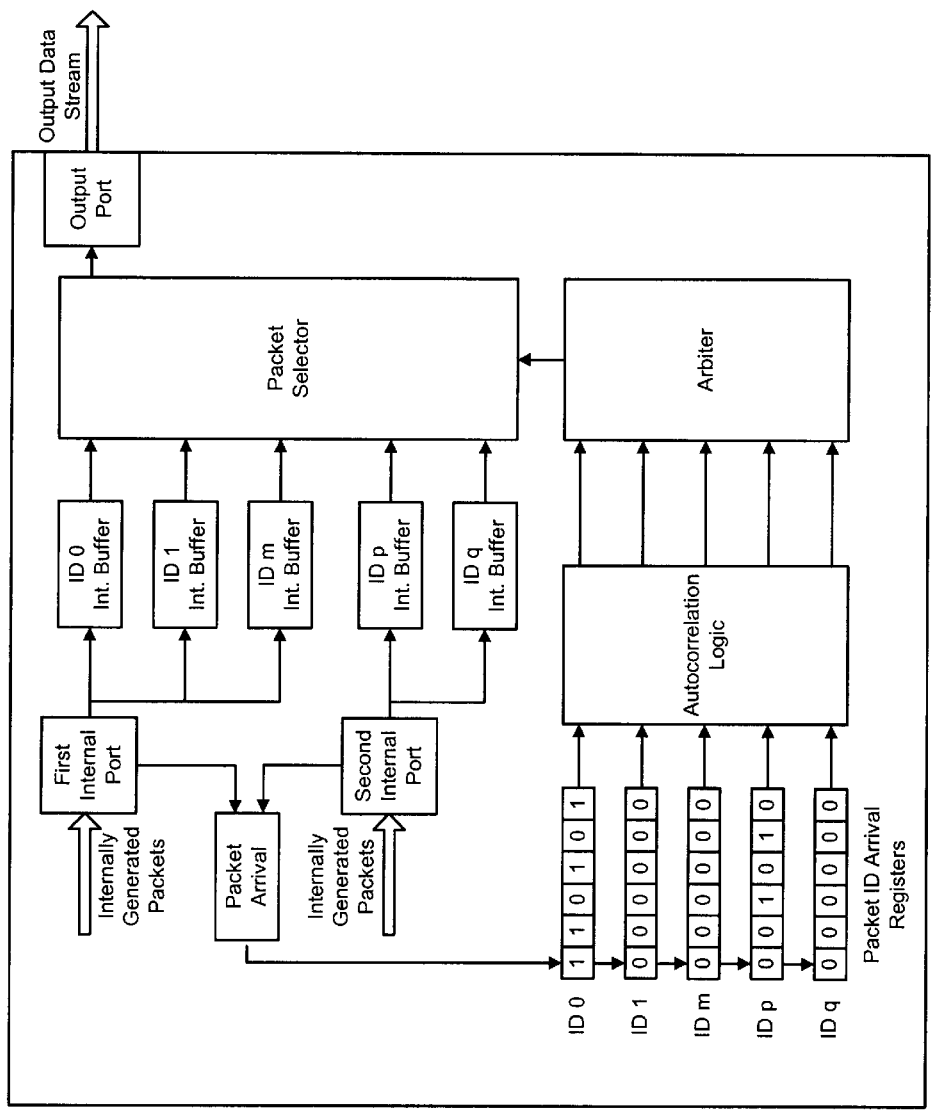
FIG. 9 presents a portion of an HT I/O device with two internal ports.

Other embodiments of the invention, such as shown in FIG. 9, would merge a plurality of internal data streams into a single output data stream. Still other embodiments of the invention would merge one or more input data streams with one or more internal data streams.

Buffer Credits

Some bus architectures, such as the HT I/O bus architecture, are flow controlled using a coupon-based scheme. In such bus architectures, a packet transmitter contains a counter that corresponds to the free space available in a buffer at the packet receiver, such as an HT I/O device. After initialization, the packet receiver sends packets to the packet transmitter to indicate the free space available in the packet transmitter buffer. This information is stored in a counter in the packet transmitter. Thereafter, when the packet transmitter sends a packet to the packet receiver, the packet transmitter decrements the counter. If the counter ever reaches zero, the packet transmitter ceases sending packets to the packet receiver.

In some embodiments of the invention, such as shown in FIG. 10, when the HT device 900 passes a packet to the first output port 990, the HT device also sends a packet containing flow control information to the packet transmitter via the second output port 995.

Conclusion

Figure 12:
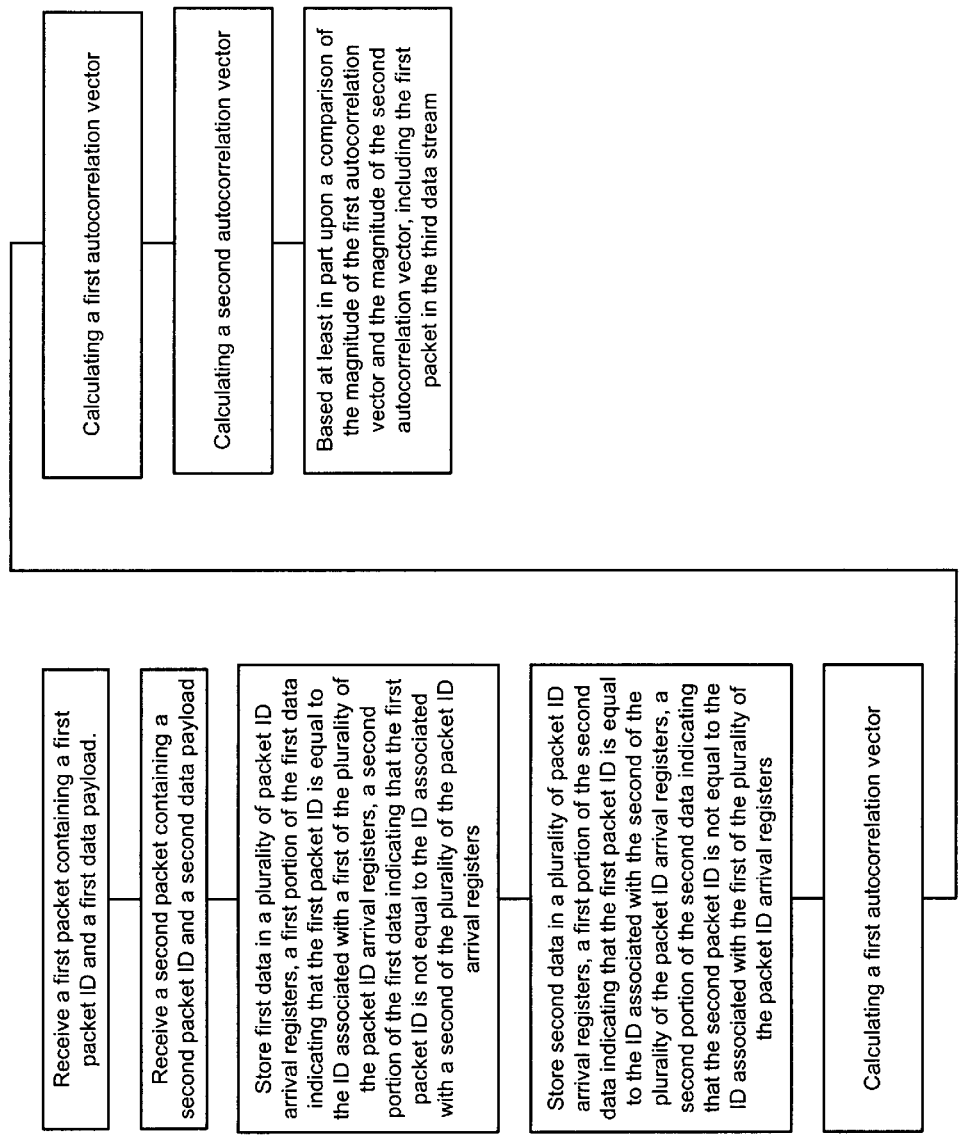
FIG. 12 presents a flow chart of a method to merge two data streams to generate a third data stream.

A summary of the previously discussed method of merging a first data stream with a second data stream to generate a third data stream is summarized in FIG. 12.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

I claim:

1. An I/O device comprising:
 a) an input port;
 b) an input buffer coupled to the input port;
 c) an internal port operable to store packets generated by the I/O device;
 d) an internal buffer coupled to the internal port;
 e) a plurality of packet ID arrival registers coupled to the input port and the internal port;
 f) autocorrelation logic coupled to the plurality of packet ID arrival registers;
 g) an arbiter coupled to the autocorrelation logic;
 h) a packet selector coupled to the arbiter, the input buffer and the internal buffer; and
 i) an output port coupled to the packet selector.

2. The I/O device of claim 1 wherein the I/O device is a HyperTransport I/O device.

3. The I/O device of claim 1, wherein the input port is coupled to a HyperTransport I/O device by a link.

4. The I/O device of claim 1, wherein the input buffer contains a packet containing a packet ID and a data payload, and wherein one of the plurality of the packet ID arrival registers contains data that indicates that the packet ID is equal to the ID associated with the packet ID arrival register.

5. The I/O device of claim 1, wherein the input buffer contains a packet containing a packet ID and a data payload, and wherein one of the plurality of the packet ID arrival registers contains data that indicates that the packet ID is not equal to the ID associated with the packet ID arrival register.

6. The I/O device of claim 1, wherein the autocorrelation logic is operable to calculate an autocorrelation vector of a plurality of packets having a first packet ID.

7. The I/O device of claim 1, wherein the arbiter includes an autocorrelation magnitude table.

8. The I/O device of claim 1, wherein the arbiter includes a maximum autocorrelation magnitude table.

9. The I/O device of claim 1, wherein the arbiter is operable to command the packet selector to select a packet from one of the plurality of input buffers based upon the output of the autocorrelation logic.

10. The I/O device of claim 1, wherein the arbiter contains circuitry for commanding the packet selector to select a packet from either the first input buffer or the second input buffer based upon the output of the autocorrelation logic.

11. The I/O device of claim 1, wherein the output port is coupled to a HyperTransport I/O device by a link.

12. An I/O device comprising:
 a) a first input port;
 b) a first input buffer coupled to the first input port;
 c) a second input port;
 d) a second input buffer coupled to the second input port;
 e) a plurality of packet ID arrival registers coupled to the first input port and the second input port;
 f) autocorrelation logic coupled to the plurality of packet ID arrival registers;

g) an arbiter coupled to the autocorrelation logic;

h) a packet selector coupled to the arbiter, the first input buffer and the second input buffer; and i) an output port coupled to the packet selector.

13. The I/O device of claim 12 wherein the I/O device is a HyperTransport I/O device.

14. The I/O device of claim 12, wherein the first input port is coupled to a first HyperTransport I/O device by a first link and the second input port ID is coupled to a second HyperTransport I/O device by a second link.

15. The I/O device of claim 12, wherein the first input buffer contains a packet with a packet ID and a data payload, and wherein one of the plurality of packet ID arrival registers contains data that indicates that the packet ID is equal to the ID associated with the packet ID arrival register.

16. The I/O device of claim 12, wherein the first input buffer contains a packet with a packet ID and a data payload, and wherein one of the plurality of packet ID arrival registers contains data that indicates that the packet ID is not equal to the ID associated with the packet ID arrival register.

17. The I/O device of claim 12, wherein the autocorrelation logic is operable to calculate an autocorrelation vector of a plurality of packets having a first packet ID.

18. The I/O device of claim 12, wherein the arbiter includes an autocorrelation magnitude table.

19. The I/O device of claim 12, wherein the arbiter includes a maximum autocorrelation magnitude table.

20. The I/O device of claim 12, wherein the arbiter is operable to command the packet selector to select a packet from one of the plurality of input buffers based upon the output of the autocorrelation logic.

21. The I/O device of claim 12, wherein the arbiter contains circuitry for commanding the packet selector to select a packet from either the first input buffer or the second input buffer based upon the output of the autocorrelation logic.

22. The I/O device of claim 12, wherein the output port is coupled to a HyperTransport I/O device by a link.

23. An I/O device comprising:

a) a first internal port operable to store packets generated by the I/O device;

b) a first internal buffer coupled to the first internal port;

c) a second internal port operable to store packets generated by the I/O device;

d) a second internal buffer coupled to the second internal port;

e) a plurality of packet ID arrival registers coupled to the first internal port and the second internal port;

f) autocorrelation logic coupled to the plurality of packet ID arrival registers;

g) an arbiter coupled to the autocorrelation logic;

h) a packet selector coupled to the arbiter, the first internal buffer and the second internal buffer; and i) an output port coupled to the packet selector.

24. The I/O device of claim 23 wherein the I/O device is a HyperTransport I/O device.

25. The I/O device of claim 23, wherein the first internal port is coupled to a first HyperTransport I/O device by a first link and the second internal port ID is coupled to a second HyperTransport I/O device by a second link.

26. The I/O device of claim 23, wherein the first internal buffer contains a packet with a packet ID and a data payload, and wherein one of the plurality of packet ID arrival registers contains data that indicates that the packet ID is equal to the ID associated with the packet ID arrival register.

27. The I/O device of claim 23, wherein the first internal buffer contains a packet with a packet ID and a data payload, and wherein one of the plurality of packet ID arrival registers contains data that indicates that the packet ID is not equal to the ID associated with the packet ID arrival register.

28. The I/O device of claim 23, wherein the autocorrelation logic is operable to calculate an autocorrelation vector of a plurality of packets having a first packet ID.

29. The I/O device of claim 23, wherein the arbiter includes an autocorrelation magnitude table.

30. The I/O device of claim 23, wherein the arbiter includes a maximum autocorrelation magnitude table.

31. The I/O device of claim 23, wherein the arbiter is operable to command the packet selector to select a packet from one of the plurality of internal buffers based upon the output of the autocorrelation logic.

32. The I/O device of claim 23, wherein the arbiter contains circuitry for commanding the packet selector to select a packet from either the first internal buffer or the second internal buffer based upon the output of the autocorrelation logic.

33. The I/O device of claim 23, wherein the output port is coupled to a HyperTransport I/O device by a link.

34. An HT I/O device comprising:

a) an input port;

b) an input buffer coupled to the input port;

c) an internal port for storing packets generated by the HT I/O device;

d) an internal buffer coupled to the internal port; and e) a plurality of packet ID arrival registers coupled to the input port and the internal port.

35. The I/O device of claim 34, wherein the first internal buffer contains a packet with a packet ID and a data payload, and wherein one of the plurality of packet ID arrival registers contains data that indicates that the packet ID is equal to the ID associated with the packet ID arrival register.

36. The I/O device of claim 34, wherein the first internal buffer contains a packet with a packet ID and a data payload, and wherein one of the plurality of packet ID arrival registers contains data that indicates that the packet ID is not equal to the ID associated with the packet ID arrival register.

* * * * *